United States Patent
Ogihara et al.

(10) Patent No.: US 7,913,042 B2
(45) Date of Patent: Mar. 22, 2011

(54) VIRTUAL STORAGE SYSTEM CONTROL APPARATUS, VIRTUAL STORAGE SYSTEM CONTROL PROGRAM AND VIRTUAL STORAGE SYSTEM CONTROL METHOD

(75) Inventors: Kazutaka Ogihara, Kawasaki (JP); Yasuo Noguchi, Kawasaki (JP); Masahisa Tamura, Kawasaki (JP); Yoshihiro Tsuchiya, Kawasaki (JP); Tetsutaro Maruyama, Kawasaki (JP); Riichiro Take, Kawasaki (JP); Minoru Kamoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/341,596

(22) Filed: Jan. 30, 2006

(65) Prior Publication Data

US 2007/0101083 A1    May 3, 2007

(30) Foreign Application Priority Data

Oct. 28, 2005   (JP) .................................. 2005-314525

(51) Int. Cl.
*G06F 12/00* (2006.01)
(52) U.S. Cl. ........ 711/154; 711/161; 711/162; 711/165; 707/659; 709/227
(58) Field of Classification Search .................... 711/114
See application file for complete search history.

(56) References Cited

U.S. PATENT DOCUMENTS

| | | | |
|---|---|---|---|
| 5,584,008 A | 12/1996 | Shimada et al. | |
| 6,145,066 A * | 11/2000 | Atkin | 711/165 |
| 6,457,109 B1 * | 9/2002 | Milillo et al. | 711/162 |
| 6,643,667 B1 | 11/2003 | Arai et al. | |
| 7,054,893 B2 | 5/2006 | Mogi et al. | |
| 7,058,731 B2 * | 6/2006 | Kodama | 710/5 |
| 7,120,740 B2 | 10/2006 | Takase et al. | |
| 7,124,246 B2 | 10/2006 | Nagasuka et al. | |
| 7,143,256 B2 | 11/2006 | Maciel | |
| 7,174,438 B2 | 2/2007 | Homma et al. | |

(Continued)

FOREIGN PATENT DOCUMENTS

JP          05-73213          3/1993

(Continued)

OTHER PUBLICATIONS

Japanese Office Action for Japanese Application No. 2005-314525 dated Oct. 20, 2010. A partial English-language translation is provided for the Japanese Office Action.

(Continued)

*Primary Examiner* — Kevin L Ellis
*Assistant Examiner* — Kalpit Parikh
(74) *Attorney, Agent, or Firm* — Fujitsu Patent Center

(57) ABSTRACT

A virtual storage system control apparatus, a virtual storage system control program and a virtual storage system control method can move one or more than one virtual volumes without suspending the services being provided. The virtual storage system control apparatus comprises a plurality of storage device control sections that assign virtual volumes to the storage devices of the virtual storage clusters, generate information on the virtual volumes, set up a link between the virtual volumes of the own virtual storage clusters and the virtual volumes of other virtual storage clusters by way of the network and copy data on the basis of the link and a management node that directs a move of a virtual volume by having the link set up according to the information on the virtual volumes.

12 Claims, 10 Drawing Sheets

U.S. PATENT DOCUMENTS

| | | | |
|---|---|---|---|
| 7,194,592 B2 | 3/2007 | Sato | |
| 7,222,172 B2 | 5/2007 | Arakawa et al. | |
| 7,287,181 B2 * | 10/2007 | Thompson | 714/6 |
| 7,302,535 B2 | 11/2007 | Satoyama et al. | |
| 7,418,549 B2 | 8/2008 | Abe | |
| 7,451,164 B2 | 11/2008 | Arai et al. | |
| 7,469,289 B2 | 12/2008 | Arakawa et al. | |
| 7,689,792 B2 | 3/2010 | Satoyama et al. | |
| 2003/0033494 A1 * | 2/2003 | Fujibayashi et al. | 711/162 |
| 2003/0188085 A1 | 10/2003 | Arakawa et al. | |
| 2004/0088417 A1 | 5/2004 | Bober et al. | |
| 2004/0153606 A1 | 8/2004 | Schott | |
| 2004/0205145 A1 * | 10/2004 | Murakami | 709/213 |
| 2005/0172073 A1 | 8/2005 | Voigt et al. | |
| 2006/0047923 A1 * | 3/2006 | Kodama | 711/161 |
| 2007/0118703 A1 | 5/2007 | Homma et al. | |
| 2009/0106515 A1 | 4/2009 | Arai et al. | |

FOREIGN PATENT DOCUMENTS

| | | |
|---|---|---|
| JP | 2000-339104 | 12/2000 |
| JP | 2001-067188 | 3/2001 |
| JP | 2001-265750 | 9/2001 |
| JP | 2003-131818 | 5/2003 |
| JP | 2003-150414 A | 5/2003 |
| JP | 2003-296039 | 10/2003 |
| JP | 2003-316522 | 11/2003 |
| JP | 2004-102815 | 4/2004 |
| JP | 2004-139217 | 5/2004 |
| JP | 2004-192174 | 7/2004 |
| JP | 2004-246770 | 9/2004 |
| JP | 2005-055963 | 3/2005 |
| JP | 2005-056200 | 3/2005 |
| JP | 2005-216306 | 8/2005 |
| JP | 2005-267501 A | 9/2005 |
| JP | 2003-296035 | 10/2005 |
| JP | 2005-276017 | 10/2005 |
| JP | 2005-301590 | 10/2005 |
| JP | 2005-301628 | 10/2005 |
| JP | 2006-505052 | 2/2006 |
| JP | 2006-522961 | 10/2006 |
| WO | WO2004/042565 | 5/2004 |
| WO | WO-2004/066278 | 8/2004 |

OTHER PUBLICATIONS

"Japanese Office Action" mailed by JPO and corresponding to Japanese application No. 2005-314525 on Jan. 19, 2010, with English translation.

* cited by examiner

| CHUNK # | STARTING POSITION | NUMBER OF BLOCKS | SN-ID | sd-ID | sd-LBA | NUMBER OF BLOCKS |
|---|---|---|---|---|---|---|
| 1 | 0 | 1024 | SN-A | sd-a | 100 | 1024 |
| 2 | 1024 | 2048 | SN-B | sd-a | 2048 | 2048 |
| 3 | 3072 | 1024 | SN-C | sd-a | 1024 | 1024 |
| 4 | 4096 | 512 | SN-A | sd-a | 8192 | 512 |

| CHUNK # | STARTING POSITION | NUMBER OF BLOCKS | SN-ID | sd-ID | sd-LBA | NUMBER OF BLOCKS |
|---|---|---|---|---|---|---|
| 1 | 0 | 1024 | SN-W | sd-a | 0 | 1024 |
| 2 | 1024 | 2048 | SN-X | sd-a | 2048 | 2048 |
| 3 | 3072 | 1024 | SN-Y | sd-a | 1024 | 1024 |
| 4 | 4096 | 512 | SN-Z | sd-a | 8192 | 512 |

FIG.10

| STORAGE DEVICE NAME | STARTING POSITION ON DEVICE | NUMBER OF BLOCKS | VV IDENTIFIER | STARTING POSITION ON VV | NUMBER OF BLOCKS |
|---|---|---|---|---|---|

STORAGE NODE A

| STORAGE DEVICE NAME | STARTING POSITION ON DEVICE | NUMBER OF BLOCKS | VV IDENTIFIER | STARTING POSITION ON VV | NUMBER OF BLOCKS |
|---|---|---|---|---|---|
| sd-a | 100 | 1024 | VV-C | 0 | 1024 |
| sd-a | 8192 | 512 | VV-C | 4096 | 512 |

STORAGE NODE B

| | | | | | |
|---|---|---|---|---|---|
| sd-a | 2048 | 2048 | VV-C | 1024 | 2048 |

STORAGE NODE C

| | | | | | |
|---|---|---|---|---|---|
| sd-a | 1024 | 1024 | VV-C | 3072 | 1024 |

STORAGE NODE W

| | | | | | |
|---|---|---|---|---|---|
| sd-a | 0 | 1024 | VV-A | 0 | 1024 |

STORAGE NODE X

| | | | | | |
|---|---|---|---|---|---|
| sd-a | 1024 | 2048 | VV-A | 2048 | 2048 |

STORAGE NODE Y

| | | | | | |
|---|---|---|---|---|---|
| sd-a | 1024 | 1024 | VV-A | 3072 | 1024 |

STORAGE NODE Z

| | | | | | |
|---|---|---|---|---|---|
| sd-a | 8192 | 512 | VV-A | 4096 | 512 |

VIRTUAL STORAGE SYSTEM CONTROL APPARATUS, VIRTUAL STORAGE SYSTEM CONTROL PROGRAM AND VIRTUAL STORAGE SYSTEM CONTROL METHOD

BACKGROUND OF THE INVENTION

1. Field of the Invention

This invention relates to a virtual storage system control apparatus, a virtual storage system control program and a virtual storage system control method for collectively controlling a plurality of virtual storage systems.

2. Description of the Related Art

Techniques for combining one or more than one storage devices or one or more than one resultant storage regions produced by dividing the storage regions of one or more than one storage devices so as to make it externally appear a single storage device are known. Such a virtual storage device is referred to as virtual volume or logical volume. The storage system that is supporting a virtual volume is referred to as virtual storage system. A virtual storage system provides an advantage of being capable of creating a virtual volume of a size that exceeds the physical limitations of a storage device.

The quantity of data stored in a storage system has been and being increasing in recent years. As the quantity of data increases, the storage system provided in advance may fall into a capacity shortage. Several methods are available to cope with such a capacity shortage.

Firstly, there is a method of preparing a new storage system having a large data storage capacity and replacing the existing storage system with the new one after moving all the data to the new one.

Secondly, there is a method of adding a node having one or more than one storage devices to consequently increase the available data storage capacity.

Thirdly, there is a method of adding a new storage system and assigning new volume or volumes to the added new storage system without blocking accesses to the existing volume or volumes.

Patent Document 1 (Jpn. Pat. Appln. Laid-Open Publication No. 2004-246770) is known as a document that describes the prior art relating to the present invention. With the data transfer method described in the patent document, a special relay device defines the cause that triggers the transfer of a virtual volume and the destination of the transfer. Then, it actually carries out the transfer and replaces the logical unit name after the completion of the transfer. The I/O processes during the transfer is managed by an applicable table. The described method is intended to concentrate the effective storage regions being controlled by the special relay device to nodes, the number of which is made as small as possible.

However, with the above-described first method, there arises a problem of how to provide services during the replacing operation and the preparatory operation for the replacement. With the above-described second method, various management problems arise in the virtual storage system as the number of storage devices and that of nodes increase. Finally, while it is possible to increase the capacity of the storage system without blocking accesses to the original volume or volumes with the above-described second and third methods, the services being provided have to be suspended when transferring from the original volume or volumes to the new volume or volumes.

There is a demand for moving one or more than one virtual volumes to a virtual storage system formed with one or more than one new nodes from a virtual storage system formed with one or more than one old nodes.

For example, if the storage node or nodes and the storage device or devices of an original virtual storage system have become obsolete with time, it will be possible to raise the level of response to accesses and the reliability of the overall system by moving virtual volumes to a new virtual storage system formed by using one or more than one storage nodes and one or more than one storage devices.

There is also a demand for moving one or more than one virtual volumes in order to exploit the new characteristic features of a newly added virtual storage system without suspending the services being provided. Such a demand may arise when a new virtual storage system is adapted to support encryption but a currently operating virtual storage system is not adapted to support encryption and data need to be encrypted for one or more than one virtual volumes having data same as those of the currently operating one or more than one virtual volumes, whichever appropriate and when a new virtual storage system is adapted to introduce check codes on a block by block basis and supports improvements of data security but a currently operating virtual storage system is not adapted to introduce check codes and cannot meet the demand for improving data security.

To the contrary, there is a demand for moving one or more than one virtual volumes in the opposite direction in order to improve the responsiveness to data accesses when the operating policy of the existing virtual storage system is replaced so that it is no longer necessary to improve the level of encryption and that of data security.

While the technique of Patent Document 1 can move data without interrupting services, the destination of move of the data cannot be beyond the above-described special relay device. Then, when the storage regions under a relay device become full and data need to be moved to the storages under some other relay device, it is necessary to suspend the services being provided and install additional storage regions.

SUMMARY OF THE INVENTION

In view of the above identified problems, it is therefore an object of the present invention to provide a virtual storage system control apparatus, a virtual storage system control program and a virtual storage system control method for moving one or more than one virtual volumes without suspending the services being provided.

In an aspect of the present invention, the above object is achieved by providing a virtual storage system control program for causing a computer to execute the control of a plurality of virtual storage clusters, the program allowing the computer to execute: a virtual volume information collecting step that collects information on the virtual volumes possessed by the virtual storage clusters from the virtual storage clusters; a link setting up step that sets up a link between a first storage device control apparatus for controlling the virtual volume of origin of move of the first virtual storage cluster and a second storage device control apparatus for controlling the virtual volume of destination of move of the second virtual storage cluster by way of a network according to the information on the virtual volumes collected in the virtual volume information collecting step; and a move of virtual volume directing step that directs a move of the virtual volume using the link to the first storage device control apparatus and the second storage device control apparatus.

A virtual storage system control program according to the invention further allows the computer to execute, after the link setting up step, an access control step that accesses the virtual volume according to the information on the virtual volumes collected in the virtual volume information collecting step.

In a virtual storage system control program according to the invention, when the data are updated for the virtual volume at the original of the link in the access control step, the update of the data is reflected to the destination of the link.

In a virtual storage system control program according to the invention, the storage device control apparatus having the virtual volume of origin of move is made to copy the data of the virtual volume of origin of move to the virtual volume of destination of move and replaces the identifier of the virtual volume of origin of move after the completion of copying the data in the move of virtual volume directing step.

In a virtual storage system control program according to the invention, the virtual volume of destination of move is assigned to the virtual storage cluster of destination of move and the identifier of the virtual volume of destination of move is replaced to the identifier of the virtual volume of origin of move after the completion of copying the data from the virtual volume of origin of move to the virtual volume of destination of move in the move of virtual volume directing step.

In a virtual storage system control program according to the invention, virtual volumes having the same combination of chunk sizes to be used are assigned to the virtual storage cluster of destination of move and a link is set up between the storage device control apparatus constituting the virtual volume of origin of move and the storage device control apparatus constituting the virtual volume of destination of move in the link setting up step.

In a virtual storage system control program according to the invention, virtual volumes using chunks all having the same size are assigned to the virtual storage cluster of destination of move and a link is set up between the storage device control apparatus for controlling the virtual volume of origin of move and the storage device control apparatus for controlling the virtual volume of destination of move in the link setting up step.

In another aspect of the present invention, there is provided a virtual storage system control apparatus for controlling the volumes of a group of storage clusters having a plurality of virtual storage clusters, the apparatus comprising: a plurality of storage device control sections that belong to the virtual storage clusters, are connected to the storage devices in the virtual storage clusters and a network, assign virtual volumes to the storage devices of the virtual storage clusters, generate information on the virtual volumes, set up a link between the virtual volumes of the own virtual storage clusters and the virtual volumes of other virtual storage clusters by way of the network and copy data on the basis of the link; and a management section that is connected to the network and directs a move of a virtual volume by having the storage device control sections in the plurality of virtual storage clusters set up the link among the virtual volumes according to the information on the virtual volumes obtained by the virtual storage clusters.

A virtual storage system control apparatus according to the invention further comprises an access control section that is connected to the network and accesses the virtual volume according to the information on the virtual volumes obtained by the management section.

In a virtual storage system control apparatus according to the invention, when the data are updated for the virtual volume at the original of the link by the access control section, the storage device control sections reflect the update of the data to the destination of the link.

In a virtual storage system control apparatus according to the invention, when receiving a direction on the origin of move for a move of a virtual volume from the management section, the storage device control sections copy the data of the virtual volume of origin of move to the virtual volume of destination of move based on the link set up by the management section and replace the identifier of the virtual volume of origin of move after the completion of copying the data.

In a virtual storage system control apparatus according to the invention, when receiving a direction on the destination of move for a move of a virtual volume from the management section, the storage device control sections assign the virtual volume of origin of move to other virtual storage clusters and replace the identifier of the virtual volume of destination of move to the identifier of the virtual volume of origin of move on the basis of the link set up by the management section after the completion of copying the data from the virtual volume of origin of move to the virtual volume of destination of move.

In a virtual storage system control apparatus according to the invention, the management section has virtual volumes having the same combination of chunk sizes as that of the virtual volume of origin of move assigned to the virtual storage cluster of destination of move and a link set up among the storage device control apparatus constituting the virtual volume.

In a virtual storage system control apparatus according to the invention, the management section has virtual volumes using chunks all having the same size assigned to the virtual storage cluster of destination of move and a link set up among the plurality of virtual volumes.

In still another aspect of the present invention, there is provided a virtual storage system control method for controlling a plurality of virtual storage clusters, the method comprising: a storage device control step that assigns virtual volumes to the virtual storage cluster of destination of move and generates information on the virtual volume; a link setting up step that sets up a link between a first storage device control apparatus for controlling the virtual volume of origin of move of the first virtual storage cluster and a second storage device control apparatus for controlling the virtual volume of destination of move of the second virtual storage cluster by way of a network according to the information on the virtual volumes obtained in the storage device control step; and a move of virtual volume directing step that directs a move of the virtual volume using the link to the first storage device control apparatus and the second storage device control apparatus.

A virtual storage system control method according to the invention further comprises an access control step that accesses the virtual volume according to the information on the virtual volumes after the link setting up step.

In a virtual storage system control method according to the invention, when the data are updated for the virtual volume at the original of the link in the access control step, the node having the virtual volume executes a link reflecting step that reflects the update of the data to the destination of the link.

Thus, according to the present invention, it is now possible to move one or more than one virtual volumes between the virtual storage systems without suspending the services being provided.

BRIEF DESCRIPTION OF THE DRAWINGS

FIG. 4 is a table schematically illustrating virtual volume information that can be used for the purpose of the present invention;

FIG. 9 is another table schematically illustrating virtual volume information at each storage node that can be used for the purpose of the present invention;

FIG. 10 is a schematic illustration of the virtual volume information of each of the storage nodes that can be used for the purpose of the present invention.

DETAILED DESCRIPTION OF THE PREFERRED EMBODIMENTS

Now, the present invention will be described in greater detail by referring to the accompanying drawings that illustrate preferred embodiments of the invention.

Firstly, the configuration of a virtual storage system to which the present invention is applicable will be described below.

Figure 1:
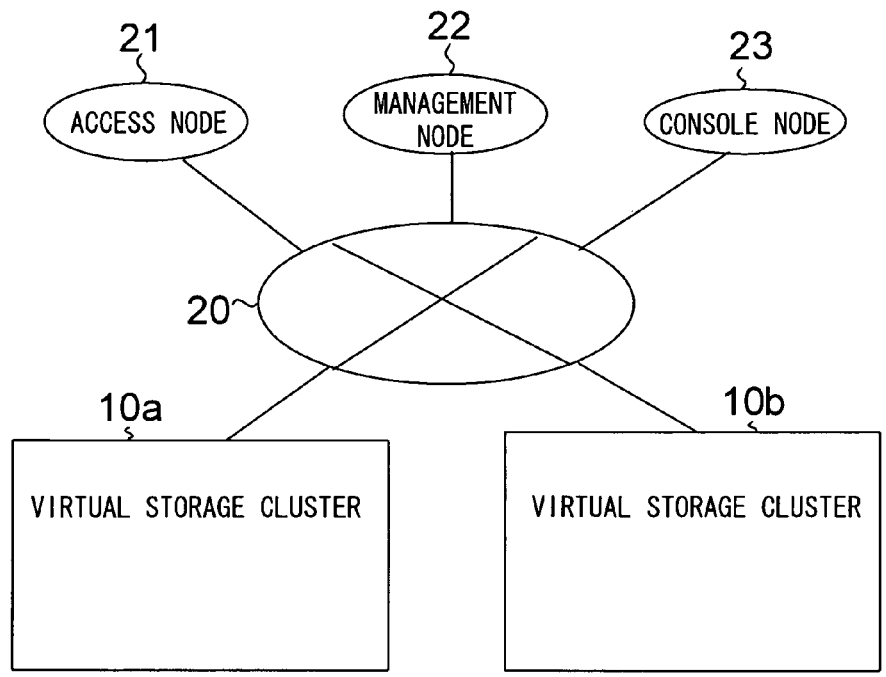
FIG. 1 is a schematic block diagram of a virtual storage system to which the present invention is applicable, illustrating the configuration thereof.

FIG. 1 is a schematic block diagram of a virtual storage system to which the present invention is applicable, illustrating the configuration thereof. As shown in FIG. 1, the virtual storage system comprises virtual storage clusters 10a and 10b, an access node (AN) 21, a management node (MN) 22 and a console node (CN) 23 that are connected to network 20. The network 20 may be an ordinary network such as TCP/IP. The nodes and the virtual storage clusters 10a and 10b exchange data and information on virtual volumes by way of the network. Different virtual storage clusters 10 can also exchange data. The console node 23 may be directly connected to the management node 22.

Now, the virtual storage cluster 10a will be described below.

Figure 2:
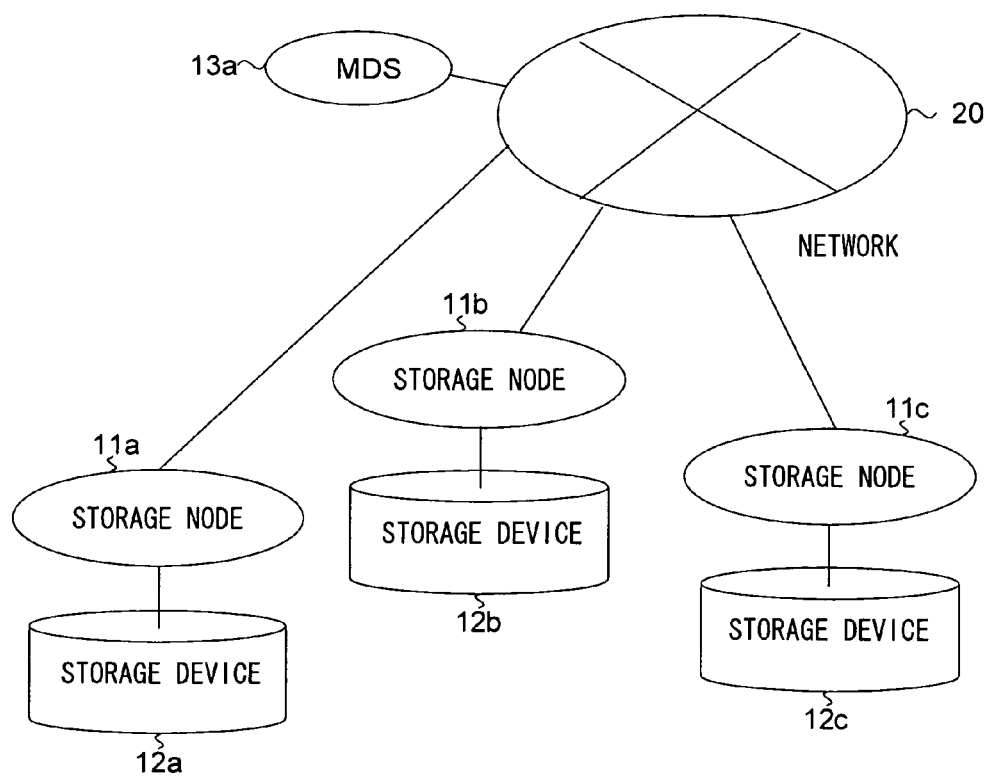
FIG. 2 is a schematic block diagram of a virtual storage cluster to which the present invention is applicable, illustrating the configuration thereof.

FIG. 2 is a schematic block diagram of a virtual storage cluster to which the present invention is applicable, illustrating the configuration thereof. On the virtual storage cluster 10a, the storage nodes (SN) 11a, 11b, 11c and the MDS (meta data server) 13a are connected to the network 20. The virtual storage cluster 10a has a configuration similar to that of any known virtual storage system, the storage nodes 11a, 11b and 11c have a functional feature of preparing and releasing links in addition to the functional features of conventional storage nodes. The virtual storage cluster 10b also has a similar configuration.

The storage devices (sd) 12a, 12b and 12c are connected respectively to the storage nodes 11a, 11b and 11c, and controlled by the nodes. The storage devices 12a, 12b and 12c may be physical disk devices such as hard disk drives or virtual storage devices such as RAID (redundant arrays of inexpensive disks).

MDS 13a manages the storage nodes 11a, 11b and 11c. The MDS 13a also collects virtual volume information in the virtual storage cluster 10a and manages the information. Additionally, the MDS 13a provides virtual volume information in response to a request from the management node 22. Various operations are carried out by way of the MDS 13a. The MDS 13a may be omitted if each of the storage nodes 11a, 11b and 11c is adapted to manage its own virtual volume information instead of the MDS 13a.

Now, the storage node 11a will be described bellow. The description of the storage node 11a also applies to the storage nodes 11b and 11c.

The storage node 11a is provided with a network interface, a storage device interface a CPU and a memory. The storage nodes in the virtual storage cluster 10a may not necessarily be identical with each other. The storage devices connected to the storage nodes in the virtual storage cluster 10a may not necessarily be identical with each other in terms of type and capacity.

The storage node 11a manages the virtual volume information of the storage device 12a connected to it. Virtual volume information indicates the virtual volume (VV) to which a certain part (chunk) in the storage device 12a belongs and the position in the virtual volume that the chunk is in charge of. Virtual volume information is prepared for each chunk and written in a nonvolatile memory medium such as a storage device 12a.

The data access request that the storage node 11a receives from a host by way of the network is basic information relating to the access. It contains the access mode (READ/WRITE), the storage device name, the access starting position, the number of blocks and a virtual volume name. The storage node 11a accesses the data of the related part when the virtual volume name in the data access request agrees with the virtual volume name in the virtual volume information but it sends back an error signal to the host when the two names do not agree with each other.

When the storage node 11a receives a reference instruction relating to the virtual volume information from a host, it delivers it to the site to be referred to and, when it receives an update instruction relating to the virtual volume information, it updates the information according to the instruction. The update instruction may relate to preparation of a virtual volume, release of a virtual volume or replacement of the identifier of a virtual volume.

Furthermore, the storage node 11a prepares or releases a virtual link between a predetermined continuous part (to be referred to as chunk hereinafter) in the storage device 12a of its own node and a predetermined continuous part in the storage device of some other node according to a direction from a host. Such a link signifies that a communication path is secured as a session is started. As long as the link remains established, the storage node 11a reflects the data update to the other end of the link.

To do this, the storage node 11a reads the chunk of the storage device 12a connected to it and transmits the data it reads to the storage node of the other end the link. Besides, the storage node 11a receives the data transmitted to it from the storage node of the origin of the link through the network and writes the data in a chunk. If the chunk is large, the storage node 11a may divide the chunk into smaller units and sequentially transmits or receives data in order to copy the chunk.

Now, a data access operation of the storage node 11a will be described below.

Figure 3:
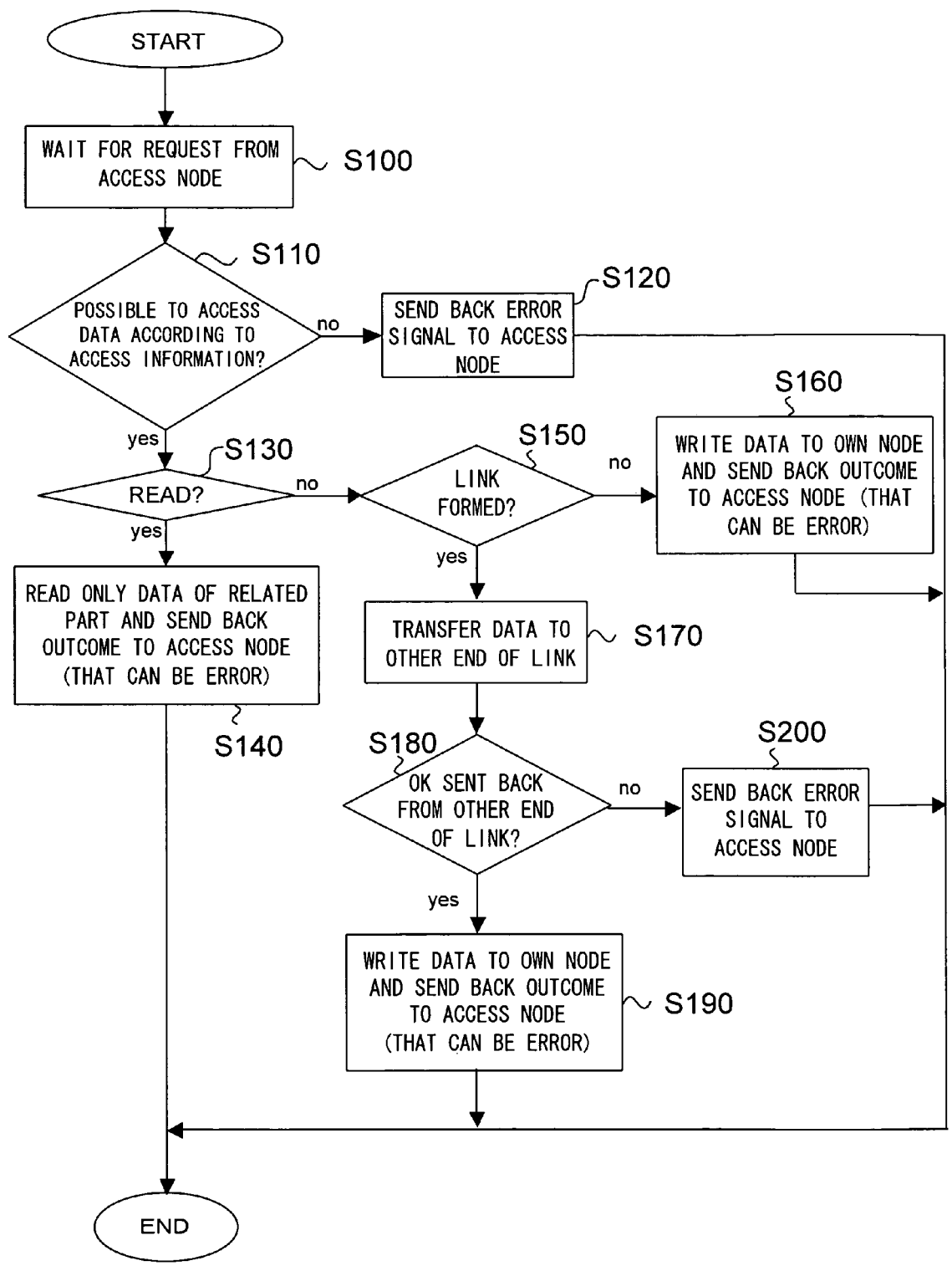
FIG. 3 is a flowchart of an operation of accessing data at a storage node according to the present invention.

FIG. 3 is a flowchart of an operation of accessing data at a storage node according to the present invention. When the storage node 11a receives an access request from the access node 21, it starts the operation of the flow. Firstly, upon receiving the access request, the storage node 11a examines the contents of the request and determines if it can access the data of the storage device 12a that belongs to the storage node 11a (S110). If, as a result, the storage node 11a determines that it cannot access the data of the storage device 12a (S110, N), it sends back an error signal to the access node 21 (S120) and ends the flow. If, on the other hand, the storage node 11a determines that it can access the data of the storage device 12a (S10, Y), it determines if the access mode is READ or not (S130).

If the access mode is READ (S130, Y), the storage node 11a reads the data and gives back the outcome of reading the data to the access node 21 (S140) before it ends the flow. In a READ mode, the storage node 11a may constantly access the storage device 12a or alternatively, if it has a cache feature, it may utilize the data stored in the cache. The outcome of reading the data includes the requested data and information on the READ error, if any, caused by an abnormal condition of the storage device 12a.

If, on the other hand, the access mode is WRITE (S130, N), the storage node 11a determines if there is a link to the chunk of the storage device that belong to some other storage node (S150).

If it is determined that there is no link (S150, N), the storage node 11a writes out the data and gives back the outcome of writing the data to the access node (S160) before it ends the flow. As in a READ mode, the storage node 11a may directly write the data in the storage device or alternatively, if it has a cache feature, it may utilize the cache feature. It should be noted that if the storage node 11a uses a cache, it needs to guarantee that the data in the memory are written in the storage device 12a in some way or other. The outcome of writing the data includes the OK response indicating that the write operation is carried out successfully and information on the WRITE error, if any, caused by an abnormal condition of the storage device 12a.

If, on the other hand, it is determined that there is a link (S150, Y), the storage node 11a transfers the data to be written to the other end of the link (S170) and waits for the outcome of the transfer from the other end of the link so that it may determine if the data are written successfully or not (S180). If it receives a message telling that the data are written successfully (S180, Y), it carries out a processing operation similar to that of S160 (S190) and ends the flow. If, on the other hand, the storage node 11a receives a message telling that the data writing operation is a failure or it does not receive any message (S180, N), it sends back an error message to the access node (S200) and end the flow. As the flow is ended, the storage node 11a waits for the next access request.

Now, the management node 22, the console node 23 and the access node 21 will be described below.

The management node 22 monitors the conditions of the virtual storage clusters 10a and 10b, and refers to and updates the virtual volume information. It copies data from a virtual storage cluster to another and also issues directions for copying data from a virtual storage cluster to another. The management node 22 itself holds minimally necessary virtual volume information (the identifiers of the virtual volumes, the virtual storage clusters to which virtual volumes belong).

If a replacement occurs to the assignment and/or the release of virtual volumes or any of the identifiers of the virtual volumes, the management node 22 has measures for reflecting it to the virtual volume information it holds in the node of itself. Additionally, the management node 22 has measures for reflecting an addition or deletion of a virtual storage cluster to the virtual volume information it holds in the node of itself. However, the management node 22 does not have detailed information of the virtual volume information and, if it receives a reference request from the console node 23 or the access node 21, it refers to the virtual volume information that the virtual storage clusters holds according to the correspondence table of the virtual storage clusters having the virtual volumes and the virtual volume identifiers in the management node 22 and the outcome of the reference is returned to the origin of the reference request.

The console node 23 issues directions to the management node 22. While the management node 22 and the console node 23 are different nodes in this embodiment, a single node may be provided to take the role of the management node 22 and that of the console node 23. Similarly, a single node may be provided to take the role of the access node 21 and that of the console node 23.

The access node 21 accesses any of the storage nodes 11a, 11b and 11c in response to a data request from a user application or the like. If some other node has a user application, it may be so adapted to receive a data request by way of the network 20. The access node 21 may be adapted to correspond to a single virtual volume or to a plurality of virtual volumes. The access node 21 may have a plurality of modules that correspond to a single virtual volume such as an SCSI device driver incorporated therein. If necessary, a virtual storage system may comprise a plurality of access nodes 21, although a single virtual volume cannot be accessed by a plurality of access nodes 21.

Now, assignment of virtual volume in a virtual storage cluster 10a will be described below.

FIG. 4 is a table schematically illustrating virtual volume information that can be used for the purpose of the present invention. The access node 21 manages the virtual volume information of each virtual volume (the starting positions on the virtual volume, the number of blocks on the virtual volume, the storage node names, the storage device names, the starting positions on the storage devices and the number of blocks on the storage devices). In this instance, four chunks of different sizes are assigned to VV-A of the storage devices 12a, 12b and 12c (sd-a) from the plurality of storage nodes 11a, 11b and 11c (SN-A, SN-B and SN-C).

The table also includes a column of chunk numbers as virtual volume information but it is referred to only in the course of the following description and may be omitted. Virtual volume information is exchanged between the storage node 11a and the management node 22 and between the management node 22 and the access node 21. While virtual volume information takes the form of a table in this embodiment, virtual volume information may be managed by using some other data structure (e.g., B-tree).

The access node 21 requests the management node 22 for virtual volume information, using the virtual volume identifiers as keys and receives the virtual volume information that is received by the management node 22 from the virtual storage clusters 10a and 10b.

Figure 5:
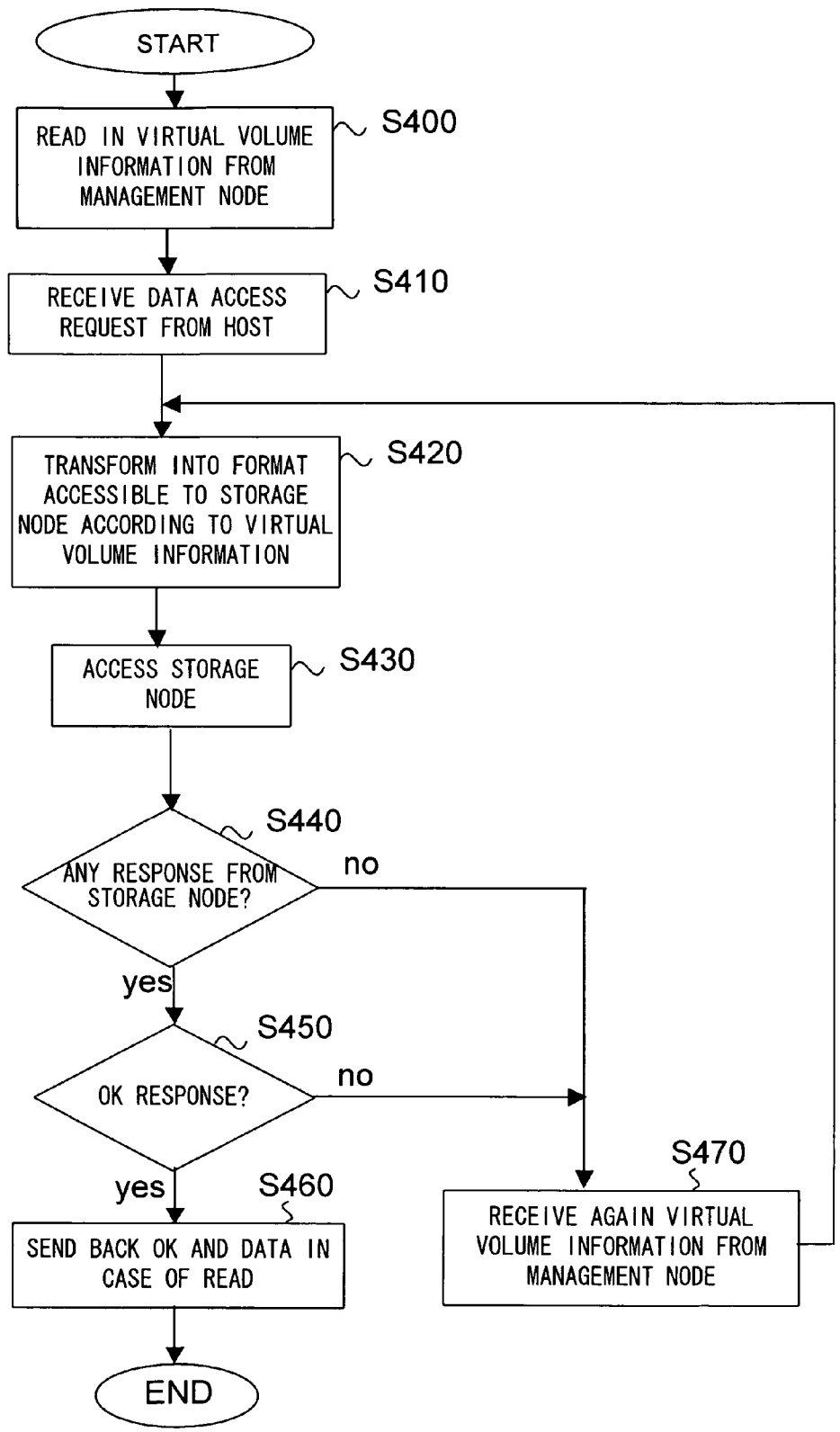
FIG. 5 is a flowchart of an operation of accessing data of an access node according to the present invention.

FIG. 5 is a flowchart of an operation of accessing data of an access node according to the present invention. While an access node 21 is used to access data in the following description, the driver that is incorporated into the OS alternatively be provided with the functional feature of the access node 21. Still alternatively, the access node 21 may be so adapted as to obtain the virtual volume information specified by way of the management node 22 at each time of accessing data.

Firstly, the access node 21 receives the virtual volume information of the virtual volume specified by way of the management node 22 at the time of incorporating it for the purpose of preparation (S400). Then, the access node 21 waits for a request for accessing data from a host (the request may come directly from a user application or from some other driver) and, upon receiving a request for accessing data (S410), it transforms the request into that of a format with which it can access the related storage node according to the virtual volume information (S420) and accesses the storage node (S430).

Thereafter, the access node 21 determines if it receives a response from the storage node it accesses (S440). If it is determined that the access node 21 receives a response (S440, Y), it then determines if the response is an OK response or not (S450). If the response is an OK response (S450, Y), the access node 21 sends back the OK message to the host and also the data, if necessary (S460) to end the flow. If, on the other hand, the access node 21 does not receive any response (S440, N) or if the response in S450 is not an OK response (S450, N), the access node 21 receives anew the virtual volume information by way of the management node 22 (S470) and retries the access before it returns to S420.

Figure 6:
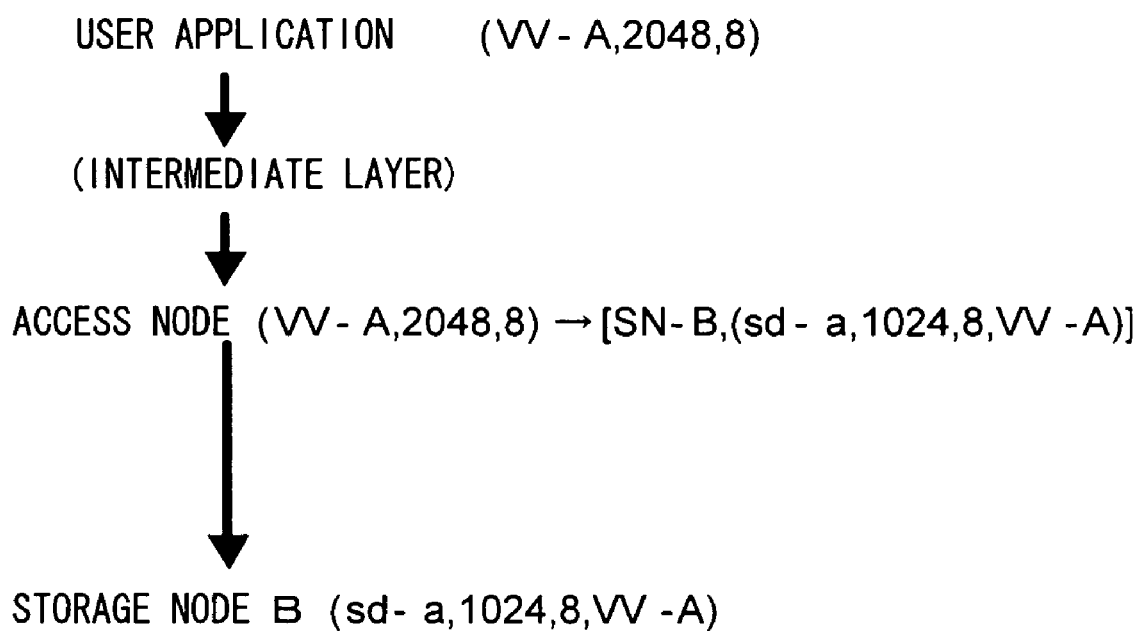
FIG. 6 is a schematic illustration of a request transformation at an access node according to the present invention.

Now, the request transforming process in S420 will be described in greater detail below. More specifically, this request transforming process uses virtual volume information as shown in FIG. 4. FIG. 6 is a schematic illustration of a request transformation at an access node according to the present invention. FIG. 6 illustrates that, when a user application accesses a region of eight blocks in the 2048 block of the virtual volume VV-A, the access node 21 transforms the access request into the storage node 1ib (SN-B) to be actually accessed and the access position of the storage device 12b on the storage node 11b and annexes a virtual volume identifier before it issues a request to the related storage node 11b (SN-B).

Now, the operation of moving a virtual volume among virtual storage clusters of the virtual storage system will be described below.

Figure 7:
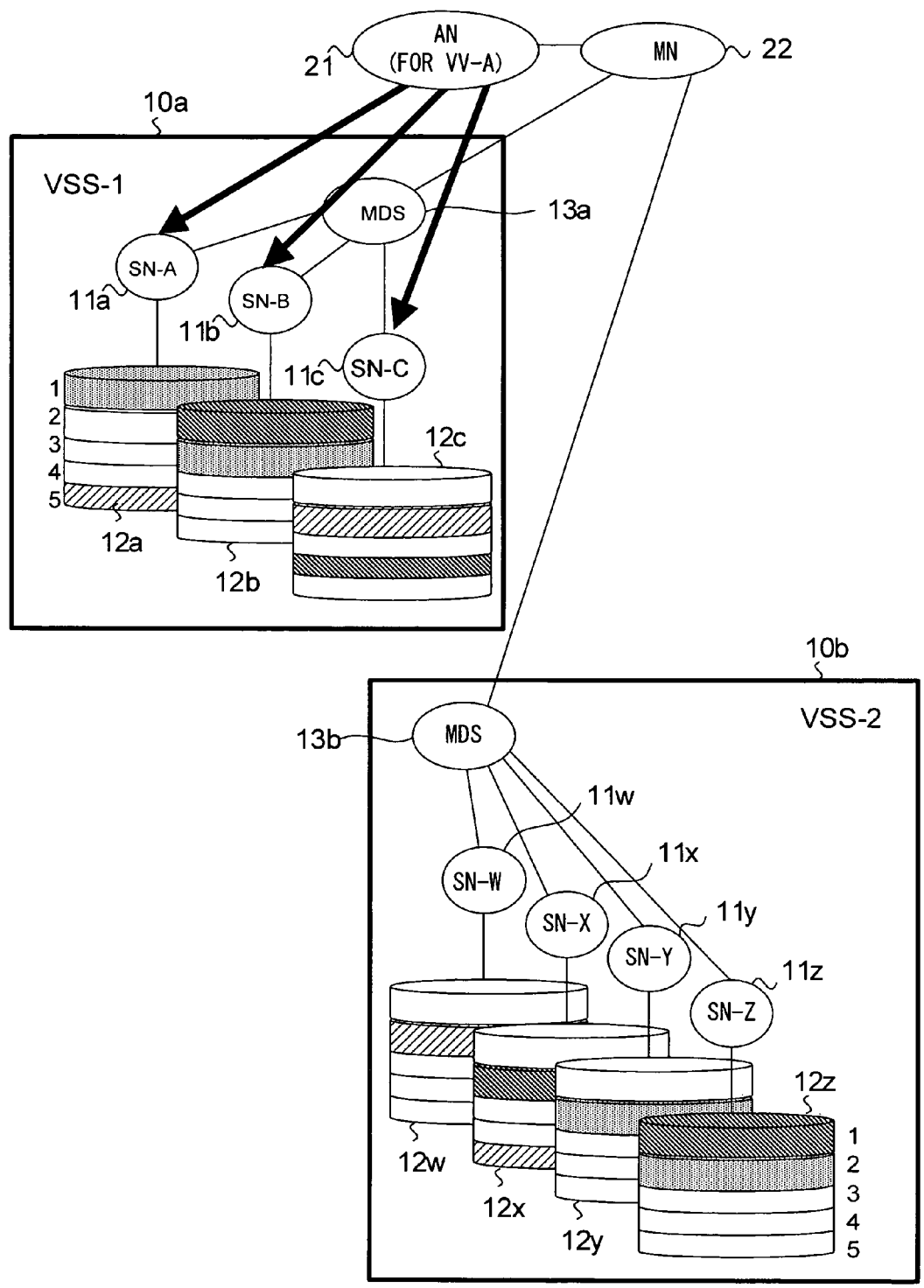
FIG. 7 is a schematic block diagram of the embodiment of virtual storage system according to the present invention in a state prior to an operation of moving a virtual volume.

FIG. 7 is a schematic block diagram of the embodiment of virtual storage system according to the invention in a state prior to an operation of moving a virtual volume. In FIG. 7, a fine line indicates a connection whereas a broad line indicates an access. In FIG. 7, the virtual storage cluster 10a that is the origin of move is denoted by VSS-1 while the virtual storage cluster 10b that is the destination of move is denoted by VSS-2. The VSS-1 comprises three storage nodes 11a, 11b and 11c (SN-A, SN-B and SN-C) while the VSS-2 comprises four storage nodes 11w, 11x, 11y and 11z (SN-W, SN-X, SN-Y and SN-Z). The storage nodes 11a, 11b, 11c, 11w, 11x, 11y and 11z are connected respectively to storage devices 12a, 12b, 12c, 12w, 12x, 12y and 12z.

When the VV-A in the VSS-1 is moved to the VSS-2, it is possible for the user to access the data of the VV-A during and after the move while keeping the user application working continuously. In other words, it is not necessary to suspend the user application. While the virtual volume is being moved, the storage node 11 carries out the data accessing process as shown in FIG. 3 and the access node 21 continues the data accessing process as shown in FIG. 5.

Figure 8:
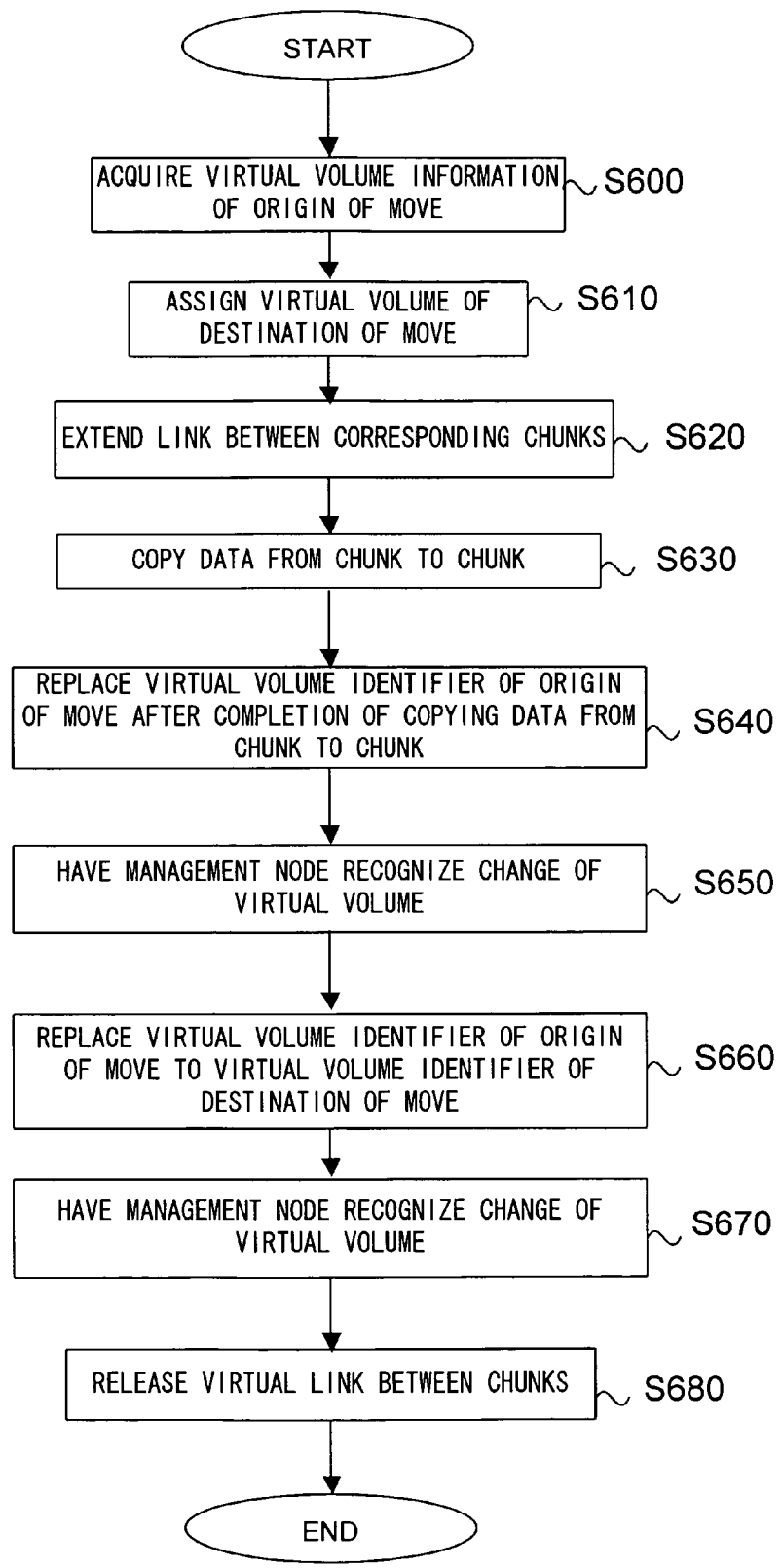
FIG. 8 is a flowchart of an operation of moving a virtual volume according to the present invention.

FIG. 8 is a flowchart of an operation of moving a virtual volume according to the present invention. Referring to FIG. 8, firstly the console node 23 acquires the virtual volume information of the VV-A in the VSS-1 by way of the management node 22 (S600). The acquisition of the virtual volume information does not affect the data accessing process to the VV-A.

Then, the console node 23 tries to acquire a virtual volume comprising chunks having sizes that are same as the chunks of the VV-A by way of the management node 22 (S610). Assume here that it can acquire virtual volume VV-B in the VSS-2. More specifically, assume that the console node 23 can acquire chunks with chunk numbers 1 through 4 (to be referred to as chunks VV-B-1, VV-B-2, VV-B-3 and VV-B-4 hereinafter) that corresponds respectively to the chunks with chunk numbers 1 through 4 (to be referred to as chucks VV-A-1, VV-A-2, VV-A-3 and VV-A-4 hereinafter) of the virtual volume VV-A. FIG. 9 is another table schematically illustrating virtual volume information at each storage node that can be used for the purpose of the present invention. Chunks are assigned to the VV-A in a manner as illustrated in the virtual volume information of FIG. 4, whereas chunks are assigned to the VV-B in a manner as illustrated in the virtual volume information of FIG. 8.

The process of acquiring a virtual volume at the VSS-2 does not affect at all the user application accessing the VV-A.

In the third step, the console node 23 extends link between the VV-A and the VV-B by way of the management node 22 (S620). If data are written to the VV-A while the link is being extended, the updating data are also delivered to the VV-B. For example, data for 20 blocks are written from the leading 10th block of the VV-A-1, the data are also actually written in the 20 blocks from the leading 10th block of the VV-B-1.

The operation of reading data from the VV-A does not give rise to any problem. However, if data are written to the VV-A, the same data are also written to the VV-B so that the data writing response may be degraded if viewed from the user application. However, the user application can nevertheless continue the data accessing process.

In the fourth step, the console node 23 has the data copied from the VV-A to the VV-B by way of the management node 22, while maintaining the extended link (S630). The data copying operation is conducted by the storage node 11 between the corresponding nodes, more specifically from the SN-A to the SN-W and the SN-Z, from the SN-B to the SN-X and from the SN-C to the SN-Y. The data copying operations of the chunks may not necessarily be conducted simultaneously. In other words, they may be conducted sequentially, taking the load and other factors into consideration.

If the data copying operation is in progress, the access node 21 may access the VV-A in response to a user request. If the access is for writing data to the VV-A, the data are also written to the corresponding part of the VV-B as described above.

In this phase, the load of the data copying operation is also applied to the VSS-1 so that the data writing response may be degraded if viewed from the user application. However, the user application can nevertheless continue the data accessing process as in the case where the link is being extended. While the data being updated are managed by means of a bit map during a data copying operation with the technique described in Patent Document 1, the present invention does not use any bit map. If there is a data to be updated, it is updated regardless if it is found at a position where the data there is to be copied or has been copied so that it is not necessary to keep a bit map.

When the operation of copying data of all the chunks is completed, the console node 23 replaces the virtual volume identifier by way of the management node 22.

To do this, firstly the console node 23 has the virtual volume identifier of the VV-A replaced by a virtual volume identifier that does not exist anywhere by way of the management node 22 (S640). Assume here that the virtual volume identifier of the VV-A is replaced to the VV-C. After having the virtual volume identifier replaced, the console node 23 causes the management node 22 to recognize that the VV-A no longer exists (S650). Then, the console node 23 replaces the identifier of the VV-B to the VV-A by way of the management node 22 (S660). After replacing the virtual volume identifier to the VV-A, the console node 23 causes the management node 22 to recognize that the VV-B no longer exists and the VV-A newly comes to exist (S670).

The replacement of the virtual volume identifier from the VV-A to the VV-C and the replacement of the virtual volume identifier from the VV-B to the VV-A should take place successively without any time gap between the two replacements. Thus, the outcome of the replaced the virtual volume identifiers need to be reflected to the management node 22 immediately.

Finally, the links between the chucks of the VV-C in the VSS-1 and those of the VV-A in the VSS-2 are released (S680). The above processing steps are indispensable. Subsequently, the console node 23 may have the VV-C released by way of the management node 22.

FIG. 10 is a schematic illustration of the virtual volume information of each of the storage nodes that can be used for the purpose of the present invention. It will be appreciated by seeing FIG. 10 that the virtual volume identifier of the VV-A is replaced to the VV-C and that of the VV-B is replaced to the VV-A.

The virtual volume identifier of the VV-A is replaced to the VV-C and hence the VV-A is not released immediately after the completion of the copying operation because, if an abnormal state arises between the time immediately before replacing the virtual volume identifier of the VV-B to the VV-A (S660) and the time when the outcome of the replacements of the virtual volume identifiers is reflected to the management node 22, the virtual volume identifier of the VV-C has to be returned to the VV-A and the unreleased VV-A provides an advantage that the access to the VV-A can be continued if the VV-A is not released. If an abnormal state arises to the VSS-2 after the completion of the operation of S670, the volume may be partly inconsistent. However, such an inconsistent volume is better than a lost volume, the data may be restored to a certain extent if the virtual volume identifier of the VV-C is replaced back to the VV-A.

If there is no access to data while the operation of replacing the virtual volume identifier is in progress, the access node 21 sticks to the assumption that the VV-A exists in the VSS-1. In other words, it tries to access the VSS-1. Since there is a discrepancy of virtual volume identifier at the storage nodes in the VSS-1, an error signal is sent back to the access node 21. Then, the access node 21 that receives the error signal refers to the management node for the location of the VV-A obtains virtual volume information telling that the VV-A is located in the VSS-2. Then, the access node 21 accesses the data of the VV-A that is located in the VSS-2 according to the new virtual volume information. In other words, the access node 21 can substantially normally access the data.

Now, assume that data are accessed while the operation of replacing a virtual volume identifier is in progress. This will be described below on a case by case basis. Firstly, before replacing the virtual volume identifier from the VV-A to the VV-C, the data of the VV-A can be accessed without any problem. While the operation of replacing the virtual volume identifier from the VV-A to the VV-C is in progress, any of several operations can be used depending on the arrangement of the VSS-1. Two examples of arrangement of the VSS-1 will be discussed below.

As the first example of arrangement, the VSS-1 may be adapted to send back an error signal to the access node 21 trying to access the data of the VV-A when the operation of replacing the virtual volume identifier starts. As the second example of arrangement, the VSS-1 may be adapted to allow the access node 21 to access the part of the data of the VV-A for which the operation of replacing the virtual volume identifier to the VV-C has not completed but sends back an error signal to the access node 21 for the part of the data of the VV-A for which the operation of replacing the virtual volume identifier to the VV-C has completed. With this arrangement, upon receiving an error signal, the access node 21 refers anew to the management node 22 for the virtual volume information.

When the operation of replacing the virtual volume identifier from the VV-A to the VV-C is over, the access node 21 receives an error signal if it tries to access the data of the VSS-1 and there can take place a moment when the VV-A does not exist at all if the access node 21 refers to the management node 22 for the virtual volume information. If such is the case, however, it is sufficient for the access node 21 to refer to the management node 22 once again after a while.

Then, in step S660, the virtual volume identifier is replaced from the VV-B to the VV-A and the outcome of the replacement is reflected to the management node 22 and further to the access node 21. Then, the access node 21 can access the data of the VV-A which is moved to the VSS-2.

Assume here that, after the access to the data of the VV-A is temporarily suspended and the operation of replacing the virtual volume identifier from the VV-A to the VV-C and also that of replacing the virtual volume identifier from the VV-B to the VV-A are over, the access to the data of the VV-A is resumed. The operation of the access node 21 and that of the storage nodes will be discussed below. The access node 21 has the virtual volume information of the VV-A as shown in FIG. 4 and decides the storage node it actually accesses according to the information. Assume here that an access request to the access node 21 as shown in FIG. 6 is received. Then, the access node 21 executes a request transforming process and tries to access the SN-B.

As the SN-B receives the request from the access node 21, it sends back an error signal to the access node 21 because the virtual volume identifier has already been replaced to the VV-C. Then, the access node 21 refers to the management node 22 for the VV-A and acquires anew the virtual volume information. The access node 21 decides to access the SN-X according to the information and the SN-X accepts the access because the part to be accessed belong to the VV-A and the range of access does not give rise to any problem.

Thus, as a virtual volume is moved in a manner as described above, it is possible to access the virtual volume that is the destination of the move without suspending data accessing process.

Now, a process of moving a virtual volume when data are duplicated in a virtual storage cluster for the purpose of data security will be described below.

The state prior to an operation of moving a virtual volume is same as the one illustrated in FIG. 7. FIG. 7 shows a state where the virtual volume that is the destination of move has already been assigned.

A device driver dedicated to the VV-A is incorporated in the access node 21 as a driver subordinate to the common driver for the SCSI of the OS. The dedicated device driver receives requests from the common driver and reports the outcome of each operation to the common driver. If it does not report the outcome of an operation within a predetermined period of time such as 30 seconds or 60 seconds after receiving a request, the same request will be given to the dedicated driver from the common driver.

Assume here that the VV-A is assigned to the VSS-1 and the data of the VV-A are accessed. In the VSS-1, each of the slices assigned to the virtual volume is duplicated. While the term of "chunk" is used above, it is assumed here that all the chunks have a same size and they are expressed as slices. Since all the slices have a predetermined size, information on the number of blocks on a virtual volume and the number of blocks on the corresponding storage device that is contained in the virtual volume information is no longer necessary so that it is possible to reduce the volume of data of the virtual volume information.

The members of a pair produced by duplication are expressed as primary and secondary. The VV-A of the VSS-1 is a virtual volume formed by assigning three slices to it. The (primary, secondary) pairs of the slices are then expressed by (SN-A-1, SN-B-2), (SN-C-4, SN-B-1) and (SN-C-2, SN-A-5). These combinations are expressed as pairs of same patterns in FIG. 7.

As the MDS 13a receives virtual volume information, it sends back (SN-A-1, SN-B-2), (SN-C-4, SN-B-1) and (SN-C-2, SN-A-5). The duplication of data is realized by way of a process as shown in FIG. 3 at each storage node. When the data of a slice are externally updated, the updated data are delivered to the secondary by way of the primary and, as the secondary gives back OK to the primary, the primary writes in the data in its own node and sends back OK to the origin of the data updating request.

The VV-B of the VSS-2 is a virtual volume formed also by assigning three slices to it. The (primary, secondary) pairs of the slices are then expressed by (SN-Y-2, SN-Z-2), (SN-X-2, SN-Z-1) and (SN-W-2, SN-X-5).

Referring to FIG. 7, a link is extended between the slice of origin of move and the slice of destination of move. The management node 22 acquires the virtual volume information on the VV-A and also the virtual volume information on the VV-B from the MDS 13a and the MDS 13b respectively and delivers the information to the corresponding storage nodes 11a, 11b and 11c so as to extend a link from the secondary of the VV-A to the primary of the VV-B. Then, as a result, links are extended in a manner as expressed by SN-B-2→SN-Y-2, SN-B-1→SN-X-2 and SN-A-5→SN-W-2.

Figure 11:
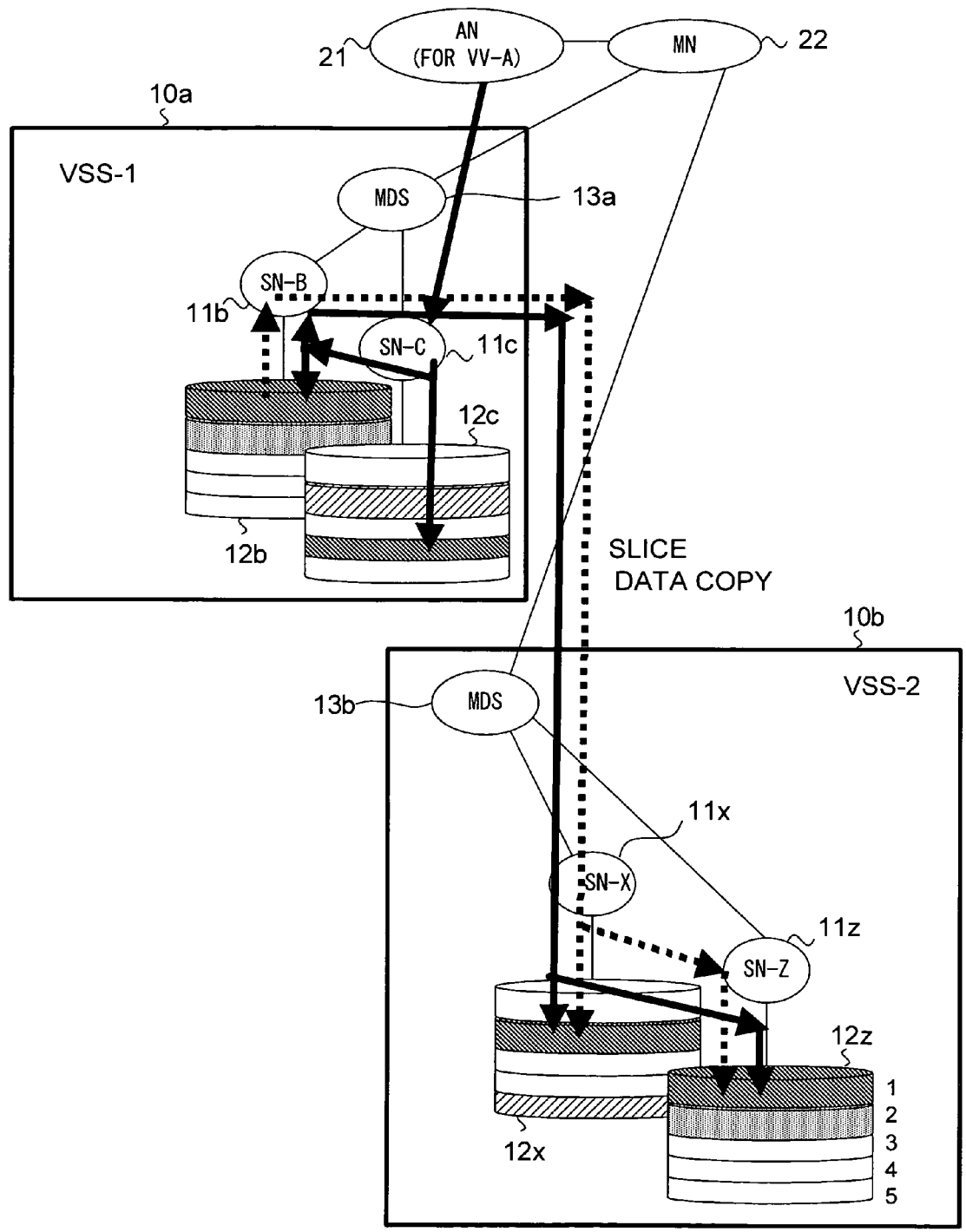
FIG. 11 is a schematic block diagram of a virtual storage system to which the present invention is applicable, illustrating a state where data are updated while the data are being copied.

FIG. 11 is a schematic block diagram of a virtual storage system to which the present invention is applicable, illustrating a state where data are updated while the data are being copied. In FIG. 11, a fine line indicates a connection whereas a broad solid line indicates an access, whereas a broad dotted line indicates a data copying operation. Thus, FIG. 11 shows a state where the data of the SN-C-4 that is the primary of the SN-B-1 are updated while the data of the SN-B-1 are being copied to the SN-X-2. In FIG. 11, the storage devices and the nodes that are not directly related to the above operations are omitted.

The operation of copying data between slices propagates from the secondary of the VV-A to the primary of the VV-B and then to the secondary of the VV-B so that the data are triplicated. On the other hand, the operation of updating data coming from the access node 21 propagates from the primary to the secondary of the VV-A and then from the primary to the secondary of the VV-B so that data are in four folds.

When the sites of data updating are managed by means of a bit map in a conventional manner, whether the data updated by the access node 21 need to be transmitted to the VV-B or not is determined and hence it is not necessary to transmit unnecessary data but a memory region is required for the purpose of using the bit map. According to the present invention, on the other hand, any updated data are transmitted because no bit map is used but the present invention provides an advantage that a node with a small memory capacity can also be used as component of a virtual storage cluster.

The move of the virtual volume is completed as the operation of copying the slices is completed and the virtual volume identifier is replaced in the above-described manner. Then, the VV-A exists in the VSS-2 but no longer exists in the VSS-1.

A move of a virtual volume between virtual storage clusters according to the invention does not need to suspend the user application so that it is very effective in a situation where the services being provided should not be suspended.

When a virtual volume is moved according to the present invention and the virtual storage cluster that is the destination of the move of the virtual volume is adapted to support encryption of data, the data of the virtual volume that does not operate for data encryption are encrypted at the time when the move of the virtual volume is completed and the virtual volume identifier is replaced. Then, the virtual volume to which the virtual volume identifier is replaced provides the services of the original virtual volume as successor of the latter.

Similarly, when a virtual volume is moved according to the present invention and the virtual storage cluster that is the destination of the move of the virtual volume is adapted to support a data check code, the data in the virtual volume that does not operate for supporting a data check code are supported for a data check code at the time when the move of the virtual volume is completed and the virtual volume identifier is replaced. Then, the virtual volume to which the virtual volume identifier is replaced provides the services of the original virtual volume as successor of the latter.

Furthermore, as a virtual storage cluster that can support both encryption of data and a data check code is selected as destination of move, it is possible to obtain a more robust virtual volume while providing the services of the original virtual volume.

To the contrary, if encryption of data is supported so far but priority needs to be given to responsiveness to data, a virtual volume may be moved from a virtual storage cluster having an encryption feature to a virtual storage cluster having no such special feature to improve the responsiveness to data.

Furthermore, according to the present invention, it is possible to provide a program for causing a computer of a virtual storage system to execute the above-described steps as virtual storage system control program. The program can be executed by a computer of a virtual storage system when it is stored in a computer-readable memory medium. Computer-readable memory mediums that can be used for the purpose of the present invention include internal memory apparatuses such as ROMs, RAMs that are installed in computers, portable type memory mediums such as CD-ROMs, flexible disks, DVD disks, magneto optical disks, and IC cards, databases for holding programs and other computers and their databases.

For the purpose of the present invention, a storage device control section corresponds to the storage node in the above-described embodiment while a management section corresponds to the management node and the console node in the above-described embodiment. Similarly, an access control section corresponds to the access node in the above-described embodiment. A virtual volume information collecting step, a link setting up step and a move of virtual volume directing step correspond to the processing operation of the console node in the above-described embodiment. Finally, a link reflecting step corresponds to the processing operation of the storage node in the above-described embodiment.

What is claimed is:

1. A non-transitory computer-readable storage medium storing a virtual storage system control program, which when executed by a computer, causes the computer to execute processing to control of a plurality of virtual storage clusters, the processing comprising:

collecting first and second information on first and second virtual volumes, the first virtual volume being assigned to a first cluster to which a plurality of first storage devices belong, the first information indicating which part of the first virtual volume a certain part in the plurality of first storage devices belong to and which position in the first virtual volume the certain part is in charge of, the first information including a first identifier assigned to the first virtual volume, the second virtual volume being assigned to a second cluster to which a plurality of second storage devices belong, the second information indicating which part of the second virtual volume a certain part in the plurality of second storage devices belong to and which position in the second virtual volume the certain part is in charge of, the second information including a second identifier assigned to the second virtual volume;

setting up a link between a first storage device control apparatus for controlling the first virtual volume and a second storage device control apparatus for controlling the second virtual volume by way of a network in response to a move request for moving data from the first virtual volume to the second virtual volume, according to the first and second information in the collecting;

accessing, with an access control section, the first virtual volume by sending a request to the first storage device control apparatus according to the first information collected in the collecting, and the second virtual volume by sending a request to the second storage device control apparatus according to the second information collected in the collecting;

causing the first storage device control apparatus and the second storage device control apparatus to copy first data stored in the first virtual volume to the second virtual volume after the link is set up, by causing the first storage device control apparatus to transmit the first data stored in the first virtual volume to the second storage device control apparatus through the link;

causing, after the first data is copied, the first storage device control apparatus to replace the first identifier assigned to the first virtual volume to another identifier which is different from the second identifier assigned to the second virtual volume, and causing the second storage device control apparatus to replace the second identifier assigned to the second virtual volume to the first identifier after the replacing of the first identifier; and releasing the link after the replacing of the second identifier, wherein when the accessing sends a request for writing second data to the first virtual volume to the first storage device control apparatus after the setting up of the link and before the releasing of the link, the first storage device control apparatus transmits the second data to the second storage device control apparatus through the link, wherein when the second storage device control apparatus receives any of the first and second data transmitted from the first storage device control apparatus through the link, the second storage device control apparatus writes the received data to the second virtual volume and sends a message indicating success or failure in the writing of the received data according to a result of the writing of the received data, wherein when the first storage device control apparatus receives from the second storage device control apparatus the message indicating the success, the first storage device control apparatus writes the second data to the first virtual volume, and wherein when the first storage device control apparatus receives from the second storage device control apparatus the message indicating the failure, the first storage device control apparatus sends an error message to the access control section.

2. The non-transitory computer-readable storage medium according to claim 1, wherein
the first and second virtual volumes have the same combination of chunk sizes.

3. The non-transitory computer-readable storage medium according to claim 1, wherein
the first and second virtual volumes use chunks all having the same size.

4. The non-transitory computer-readable storage medium according to claim 1 wherein
when the first virtual volume is accessed by the accessing while the first storage device control apparatus replaces the first identifier to the another identifier, the first storage device control apparatus outputs an error signal, and
the accessing accesses the second virtual volume according to the first identifier after the second storage device control apparatus replaces the second identifier to the first identifier.

5. A virtual storage control apparatus comprising:

a first storage device control section connected to a plurality of first storage devices and a network, the plurality of first storage devices belonging to a first cluster, to assign a first virtual volume to the first cluster, and to generate first information, the first information indicating which part of the first virtual volume a certain part in the plurality of first storage devices belong to and which position in the first virtual volume the certain part is in charge of, the first information including a first identifier assigned to the first virtual volume;

a second storage device control section connected to a plurality of second storage devices and the network, the plurality of second storage devices belonging to a second cluster, to assign a second virtual volume to the second cluster, and to generate second information, the second information indicating which part of the second virtual volume a certain part in the plurality of second storage devices belong to and which position in the second virtual volume the certain part is in charge of, the second information including a second identifier assigned to the second virtual volume;

a management section connected to the network, to collect the first information and the second information via the network; and an access control section connected to the network, to access the first virtual volume by sending a request to the first storage device control section according to the first information collected by the management section and to access the second virtual volume by sending a request to the second storage device control section according to the second information, wherein the management section sets up a link between the first storage device control section and the second storage device control section in response to a move request for moving data from the first virtual volume to the second virtual volume, according to the collected first and second information, wherein the management section causes the first storage device control section and the second storage device control section to copy first data stored in the first virtual volume to the second virtual volume after the link is set up, by causing the first storage device control apparatus to transmit the first data stored in the first virtual volume to the second storage device control apparatus through the link, wherein the management section, after the first data is copied, causes the first storage device control section to replace the first identifier assigned to the first virtual volume to another identifier which is different from the second identifier assigned to the second virtual volume, and causes the second storage device control section to replace the second identifier assigned to the second virtual volume to the first identifier after the replacing of the first identifier, wherein the management section releases the link after the replacing of the second identifier, wherein when the access control section sends a request for writing second data to the first virtual volume to the first storage device control apparatus after the setting up of the link and before the releasing of the link, the first storage device control apparatus transmits the second data to the second storage device control apparatus through the link, wherein when the second storage device control apparatus receives any of the first and second data transmitted from the first storage device control apparatus through the link, the second storage device control apparatus writes the received data to the second virtual volume and sends a message indicating success or failure in the writing of the received data according to a result of the writing of the received data, wherein when the first storage device control apparatus receives from the second storage device control apparatus the message indicating the success, the first storage device control apparatus writes the second data to the first virtual volume, and wherein when the first storage device control section receives from the second storage device control section the message indicating the failure, the first storage device control section sends an error message to the access control section.

6. The apparatus according to claim 5, wherein the first and second virtual volumes have the same combination of chunk sizes.

7. The apparatus according to claim 5, wherein the first and second virtual volumes use chunks all having a same size.

8. The apparatus according to claim 5, wherein when the access control section accesses the first virtual volume while the management section replaces the first identifier to the another identifier, the first storage device control section sends back an error signal to the access control section, and the access control section accesses the second virtual volume according to the first identifier after the management section replaces the second identifier to the first identifier.

9. A virtual storage system control method comprising:
assigning first and second virtual volumes to first and second virtual storage clusters respectively;

generating first information indicating which part of the first virtual volume a certain part in the first virtual storage cluster belongs to and which position in the first virtual volume the certain part is in charge of, the first information including a first identifier assigned to the first virtual volume;

generating second information indicating which part of the second virtual volume a certain part in the second virtual storage cluster belongs to and which position in the second virtual volume the certain part is in charge of, the second information including a second identifier assigned to the second virtual volume;

setting up a link between a first storage device control apparatus for controlling the first virtual volume and a second storage device control apparatus for controlling the second virtual volume by way of a network in response to a move request for moving data from the first virtual volume to the second virtual volume, according to the first and second information;

accessing, with an access control section, the first virtual volume by sending a request to the first storage device control apparatus according to the first information, and the second virtual volume by sending a request to the second storage device control apparatus according to the second information;

causing the first storage device control apparatus and the second storage device control apparatus to copy first data stored in the first virtual volume to the second virtual volume after the link is set up, by causing the first storage device control apparatus to transmit the first data stored in the first virtual volume to the second storage device control apparatus through the link;

causing, after the first data is copied, the first storage device control apparatus to replace the first identifier assigned to the first virtual volume to another identifier which is different from the second identifier assigned to the second virtual volume, and causing the second storage device control apparatus to replace the second identifier assigned to the second virtual volume to the first identifier after the replacing of the first identifier; and releasing the link after the replacing of the second identifier, wherein when the accessing sends a request for writing second data to the first virtual volume to the first storage device control apparatus after the setting up of the link and before the releasing of the link, the first storage device control apparatus transmits the second data to the second storage device control apparatus through the link, wherein when the second storage device control apparatus receives any of the first and second data transmitted from the first storage device control apparatus through the link, the second storage device control apparatus writes the received data to the second virtual volume and sends a message indicating success or failure in the writing of the received data according to a result of the writing of the received data, wherein when the first storage device control apparatus receives from the second storage device control apparatus the message indicating the success, the first storage device control apparatus writes the second data to the first virtual volume, and wherein when the first storage device control apparatus receives from the second storage device control apparatus the message indicating the failure, the first storage device control apparatus sends an error message to the access control section.

10. The method according to claim 9, wherein the first and second virtual volumes have the same combination of chunk sizes.

11. The method according to claim 9, wherein the first and second virtual volumes use chunks all having the same size.

12. The method according to claim 9, wherein when the first virtual volume is accessed by the accessing while the first storage device control apparatus replaces the first identifier to the another identifier, the first storage device control apparatus outputs an error signal, and the accessing accesses the second virtual volume according to the first identifier after the second storage device control apparatus replaces the second identifier to the first identifier.

* * * * *